United States Patent [19]

Thomas

[11] Patent Number: 5,852,291
[45] Date of Patent: Dec. 22, 1998

[54] LOW PROFILE NIGHT VISION GOGGLE HAVING A FIBER OPTIC ELEMENT

[75] Inventor: Nils Ian Thomas, Roanoke, Va.

[73] Assignee: ITT Manufacturing Enterprises, Inc., Wilmington, Del.

[21] Appl. No.: 903,641

[22] Filed: Jul. 31, 1997

[51] Int. Cl.$^6$ ..................................................... H01J 40/14
[52] U.S. Cl. ................................ 250/214 VT; 250/227.11
[58] Field of Search ...................... 250/214 VT, 227.11, 250/207; 313/524

[56] References Cited

U.S. PATENT DOCUMENTS 5,416,315  5/1995  Filipovich ........................ 250/214 VT
5,420,414  5/1995  Wentworth ........................ 250/214 VT

*Primary Examiner*—Que Le
*Attorney, Agent, or Firm*—Plevy & Associates

[57] ABSTRACT

A night vision goggle system having an objective lens for viewing an image scene, an image intensifier tube for amplifying a received image scene, an eyepiece lens for presenting the amplified image scene produced at the output of the image intensifier tube to a user's eye, and a fiber-optic element for folding an optical path between the image intensifier tube and one of the eyepiece lens and the objective lens thereby minimizing the length and weight of the system.

20 Claims, 5 Drawing Sheets

LOW PROFILE NIGHT VISION GOGGLE HAVING A FIBER OPTIC ELEMENT

FIELD OF THE INVENTION

The present invention relates generally to night vision systems, and more particularly to a low profile night vision goggle system which employs one or more fused fiber-optic bundle elements that operate to fold the optical path of the system.

BACKGROUND OF THE INVENTION

Night vision goggle systems are well known in the art for enabling a person to see at night or in low-light conditions by amplifying the available light. Many of these night vision goggle systems are attached to a helmet or a head-gear set which is worn on a user's head. Most night vision goggle systems are fairly heavy, at greater than one pound, and extend out in front of the user's face by several inches. While some systems are reasonably comfortable, most are not. All night vision goggle systems have an image intensifier tube which is the active component of the system that amplifies the night or low-light image. Night vision goggle systems also require an objective lens which focuses a viewed image on the image intensifier tube, an eyepiece to recollimate the image so that the eye can correctly see the amplified image, and means for inverting the image for the eyepiece.

There are several night vision goggle system designs in the prior art. One design as depicted in FIG. 1A, uses a fused fiber-optic bundle 18 incorporated into the image intensifier tube 10 for inverting an image into the eyepiece lens 14. The fiber-optic bundle 18 performs the image inversion in the shortest distance, however, the optical elements must all be in a straight line thereby placing the objective lens 12 and image intensifier tube 10 a significant distance in front of a user's eye 16. The result is a very high perceived weight and imbalance of the goggle on the user's head. Awkwardness in use is sometimes a problem as the objective lens 12 has a propensity to hit close objects like airplane cockpit canopies. A typical weight of the lightest system of this type is 1.02 pounds. The ANVIS (AN/AVS-6) is a typical example of this type system design.

Another design uses prisms or fold mirrors to invert the image as shown in FIGS. 1B and 1C. A first version of this design, shown in FIG. 1B, uses an optical collimator 18' to invert the image, a beam splitter 20 to split the image and a prism or fold mirror 22 and a simple telescope consisting of two lenses 14' to present the split image to each eye 16. The total optical path of this system is longer than the design of FIG. 1A but, the prism/fold mirrors 22 allow the physical distance in front of the user's head to be only slightly longer than the fiber-optic inverter design of FIG. 1A. The image intensifier tube 10 in this design can have either a non-inverting fiber-optic or glass screen. In order to cut costs, these systems usually have one image intensifier tube which degrades performance. The AN/PVS-7 or ITT's Night Mariner are typical of this design.

A second version of the prism or fold mirror design as shown in FIG. 1C, uses all prisms or fold mirrors 22' to do both the image inversion and optical folding. All prism or fold mirror designs are heavier in weight than the fiber-optic inverter design of FIG. 1A, as the intention is to fold the optical path for lower profile. Both versions of the prism or fold mirror design require significant glass to perform the optical inversion. One additional constraint of the prism or fold mirror design is the field of view of the system is limited to about 40 degrees. When larger fields of view are designed, the glass weight goes up significantly as compared to the fiber-optic inverter method. ITT, the assignee herein, has a design called the Merlin system which is representative of the prism or fold mirror design of night vision goggle systems. Moreover, U.S. Pat. No. 5,416,315 is another typical embodiment of the prism or fold mirror design.

Another prior art design, referred to as the Panoramic Night Vision Goggle, is shown in FIG. 1D. This night vision goggle system uses prism or fold mirrors 22" to perform both image inversion and folding of the optical path as described above, however, two channels per eye are used to give a larger field of view. This means that four sets of lens, image intensifier tubes and prisms/mirrors are used in this night vision goggle system.

Accordingly there is a need for a night vision goggle system which can be constructed with a substantially lower profile and weight as compared to the night vision goggle systems of the prior art.

SUMMARY

A night vision goggle system comprising an objective lens for viewing an image scene, an image intensifier tube for amplifying a received image scene, an eyepiece lens for presenting the amplified image scene produced at the output of the image intensifier tube to a user's eye, and a fiber-optic element for folding an optical path between the image intensifier tube and one of the eyepiece lens and the objective lens thereby minimizing the length and weight of the system.

In one embodiment the night vision goggle system further comprises a second fiber-optic element for folding a second optical path between the image intensifier tube and the other one of the eyepiece lens and the objective lens thereby further minimizing the length of the system.

In another embodiment of the night vision goggle system, fiber-optic element also inverts the image scene and/or magnifies/demagnifies the image scene.

In still another embodiment of the night vision goggle system comprises first, second, third, and fourth objective lenses, first, second, third and fourth image intensifier tubes, first, second, third, and fourth eyepiece lenses, and first, second, third, and fourth fiber-optic elements for folding optical paths between the first, second, third and fourth image intensifier tubes and their respective first, second, third, and fourth eyepiece lenses. The first, second, third, and fourth objective lenses, intensifier tubes, and fiber-optic elements define first, second, third and fourth optical channels, the optical channels providing a panoramic field of view of the image scene to the user's eye.

In a further embodiment of the night vision goggle system, the system comprises first, second, third, and fourth objective lenses, first, second, third and fourth image intensifier tubes, first and second eyepiece lenses, and first and second fiber-optic elements. The first fiber-optic element folds optical paths between the first and second image intensifier tubes and the first eyepiece lens and the second fiber-optic element folds optical paths between the third and fourth image intensifier tubes and the second eyepiece lens. The first, second, third, and fourth objective lenses and image intensifier tubes define first, second, third and fourth optical channels, the optical channels providing a panoramic field of view of the image scene to the user's eye.

BRIEF DESCRIPTION OF THE DRAWINGS

For the purpose of illustrating the present invention, reference should be made to the following drawings wherein.

DETAILED DESCRIPTION OF THE INVENTION

Figure 1A:
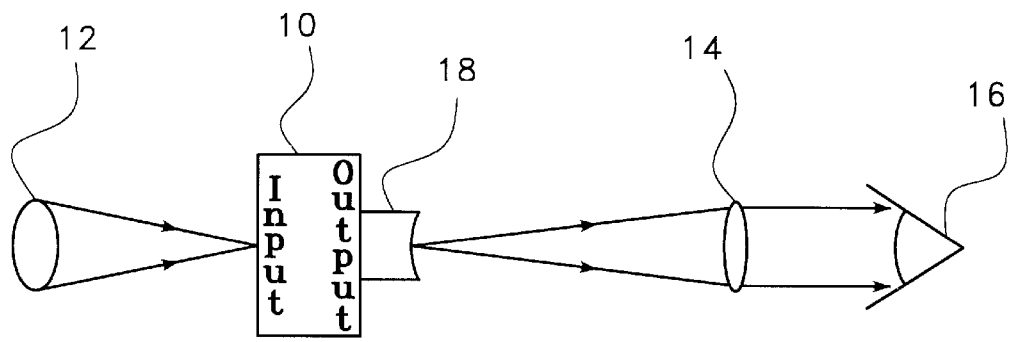
FIGS. 1A–1D depict prior art night vision goggle systems.
Figure 1B:
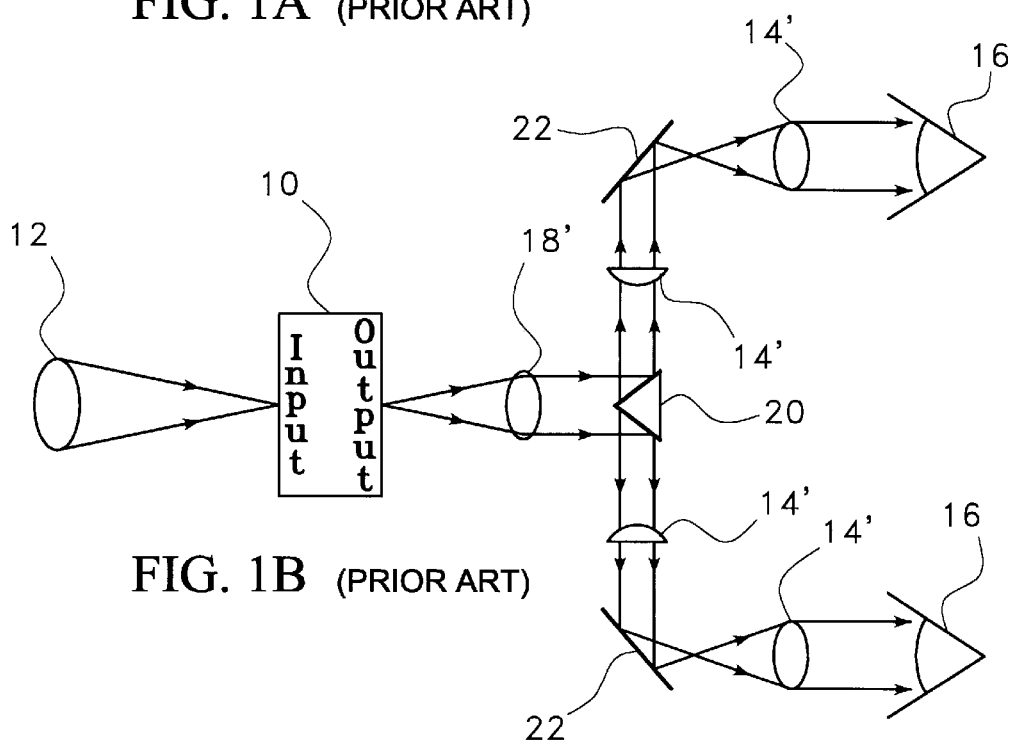
Figure 1C:
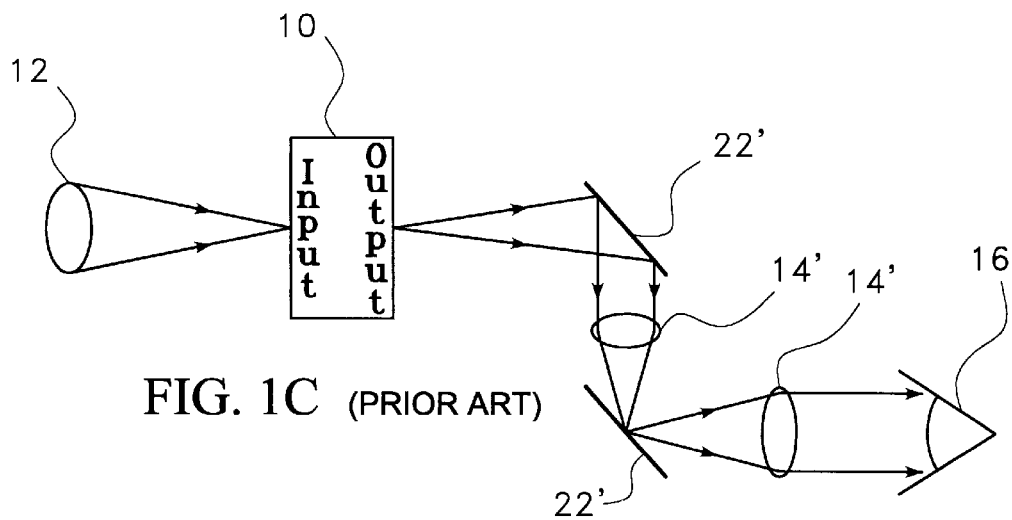
Figure 1D:
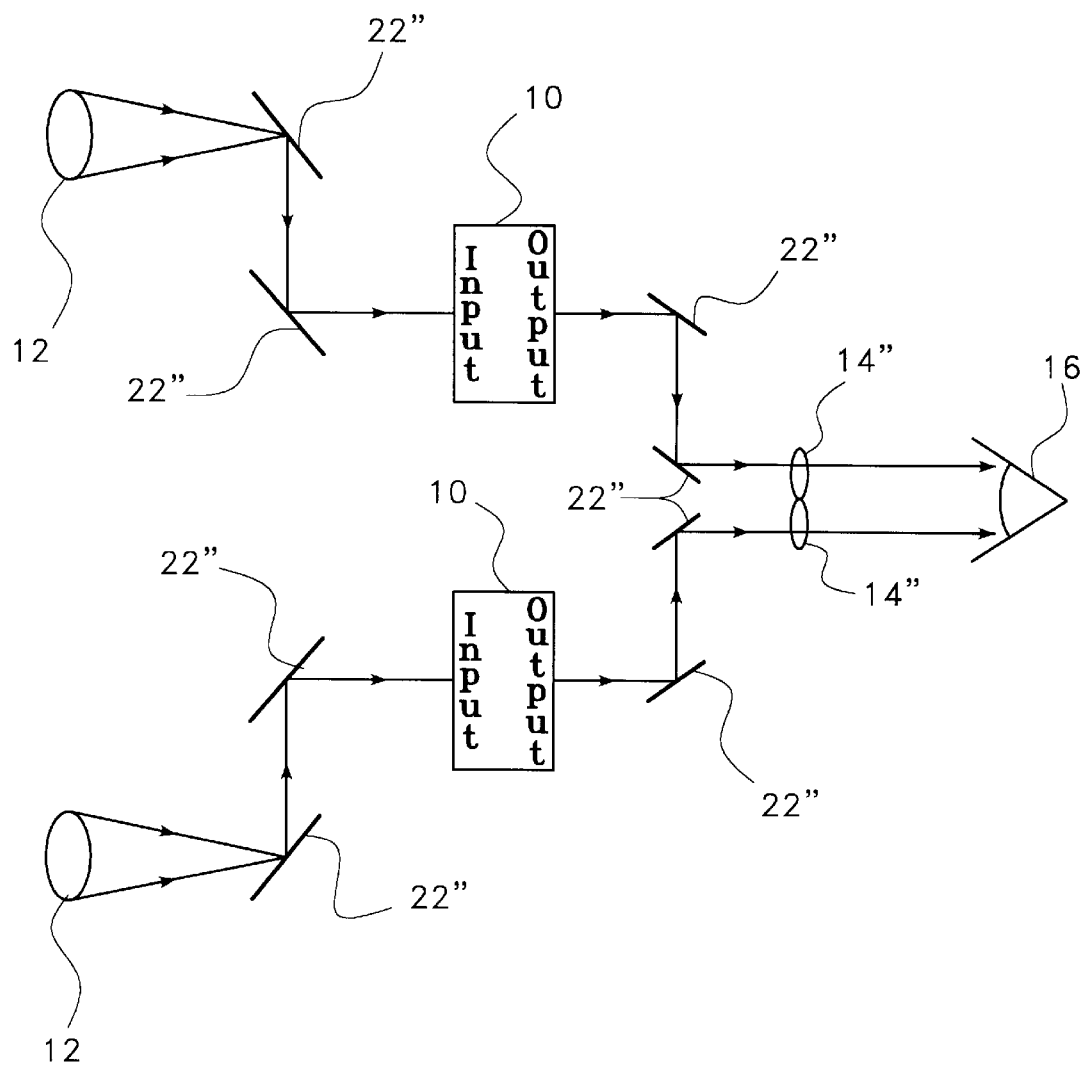
Figure 2:
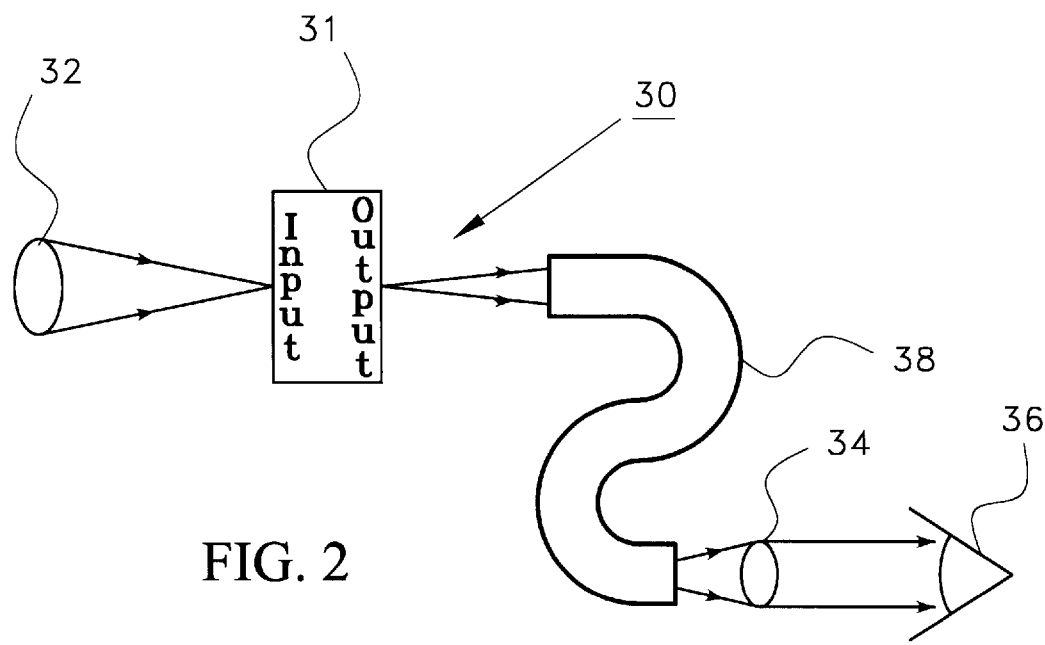
FIG. 2 schematically depicts a night vision goggle system made in accordance with a first embodiment of the present invention.

Referring now to the drawings where like numerals denote like elements, there is shown in FIG. 2, a schematic view depicting a night vision goggle system in accordance with a first embodiment of the present invention, denoted by numeral 30. Since the system components for each of a user's eyes are substantially identical, only one-half of the system is depicted in FIG. 2 (and FIGS. 3A, 3B, 4A, and 4B) to simplify the description of the invention.

Similar to other night vision goggle systems, the night vision goggle system 30 of the present invention has an objective lens 32, an image intensifier tube 31 and an eyepiece lens 34. The objective lens 32 focuses a viewed image into the input of the image intensifier tube 31 and the eyepiece lens 34 recollimates the amplified image produced at the output of the image intensifier tube 31 for presentation to a user's eye 36.

The prism and/or fold mirrors (and sometimes collimators) used in typical prior art systems for folding or bending the optical path between the image intensifier tube and the eyepiece lens and/or objective lens, is replaced in the night vision goggle system of the present invention by a fused fiber-optic bundle element. The fused fiber-optic bundle element is used in the present invention as an image carrier because it can be formed or bent into various turns and bends of virtually any angle and still efficiently conduct the image.

The embodiment depicted in FIG. 2, employs a fused fiber-optic bundle element 38 for folding the optical path between the image intensifier tube 31 and the eyepiece lens 34 in order to substantially reduce the length and thus, the profile of the system 30.

Fused fiber-optic bundle elements are well known in the art and are made up of a plurality of transparent, fused together dielectric fibers of glass or plastic which efficiently conduct light from one point in space to another. In some embodiments of the present invention, it is contemplated that the fused fiber-optic bundle elements can be made flexible so that the eyepiece or objective lenses can be moved relative to the image intensifier tube to virtually any desired position by a user. In other embodiments of the system of the present invention, the fused fiber-optic bundle elements can be made rigid, thereby allowing the optical designer to choose the relative locations of the eyepiece lens and the objective lens and the image intensifier tube. In either case, such fiber-optic bundle elements are commercially available from a variety of sources or can be easily produced using any one of a variety of well known techniques.

In many embodiments of the night vision system of the present invention, the fused fiber-optic bundle element(s) can be constructed to invert and/or magnify/demagnify the image as well as translate the image by folding techniques using standard techniques. In the embodiment depicted in FIG. 2, the fused fiber-optic bundle element 38 has two greater than 90 degree bends which fold or bend the optical path a proportional number of degrees. This allows the profile and weight of the night vision goggle system 30 of the present invention to be substantially reduced over equivalent prior art systems which employ heavy prisms and/or fold mirrors which fold or bend the optical path in only 90 degree increments.

One of ordinary skill in the art will of course recognize that prior art systems which use prisms or fold mirrors for optical path folding, are not limited in theory, to 90 degree fold or bends in the optical path. However, in practice it has been found that prisms or fold mirrors which make folds or bends in the optical path that are greater than or less than 90 degrees, produce images which are substantially degraded.

Accordingly, the fused fiber-optic bundle element in the system of the present invention allows the optical path between the image intensifier tube and the eyepiece lens to be folded or directed around a user's head or helmet to substantially reduce the profile and also provides a substantial weight savings over comparable prior art systems in that the night vision goggle system 30 weighs under one pound. Thus, the night vision goggle system of the present invention provides improved comfort and utility. To achieve a similar reduction in profile in a prior art system would require additional lens, prism, and/or mirror arrangements which add weight, expense, and complexity to the system.

Figure 3A:
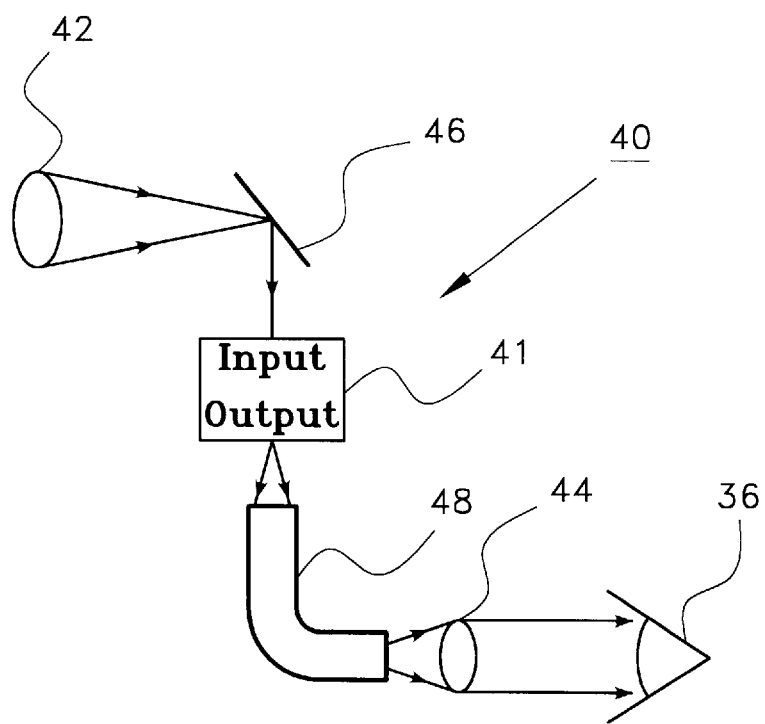
FIG. 3A schematically depicts a night vision goggle system made in accordance with a second embodiment of the present invention.

In FIG. 3A, a second embodiment of the system of the present invention is shown and denoted by the numeral 40. In this embodiment a fold mirror 46 is provided after the objective lens 42 to bend the optical path 90 degrees so that the image intensifier tube 41 can be oriented vertically to provide the user with an unobstructed peripheral field of view. An L-shaped fused fiber-optic bundle element 48 is positioned at the output of the image intensifier tube 41 to fold or bend the optical path 90 degrees for the eyepiece lens 44.

Figure 3B:
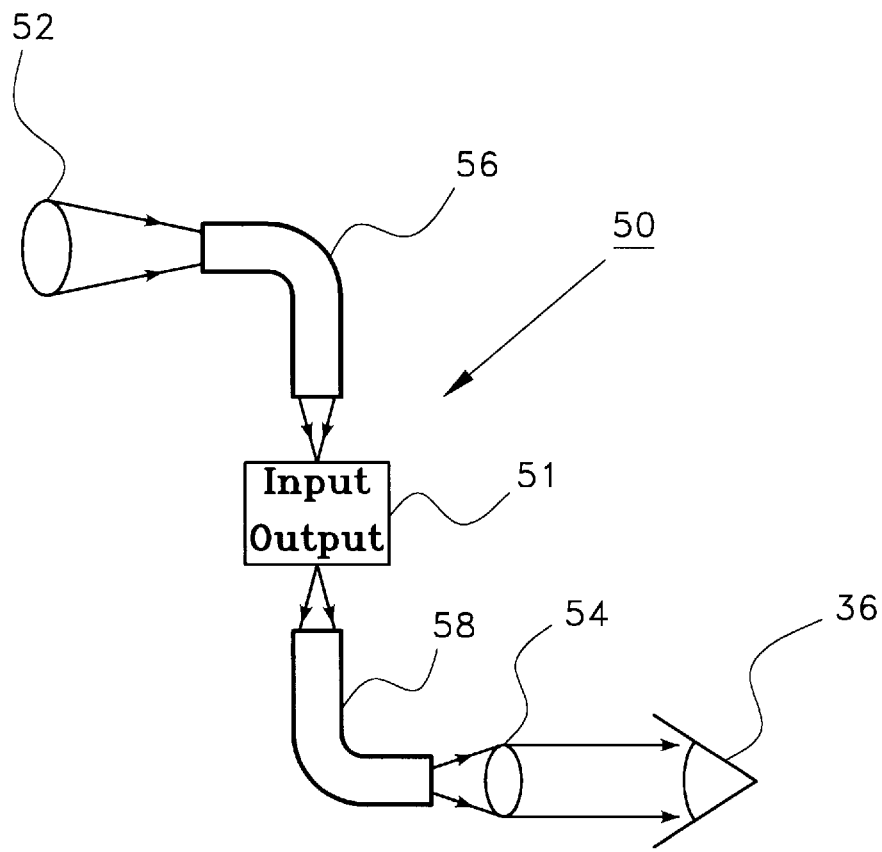
FIG. 3B schematically depicts a night vision goggle system made in accordance with a third embodiment of the present invention.

In FIG. 3B, a third embodiment of the system of the present invention is shown and denoted by the numeral 50. In this embodiment the fold mirror 46 shown in the embodiment of FIG. 3A, is replaced by L-shaped fused fiber-optic bundle element 56 to fold or bend the optical path 90 degrees between the objective lens 52 and the input of the image intensifier tube 51.

Figure 4A:
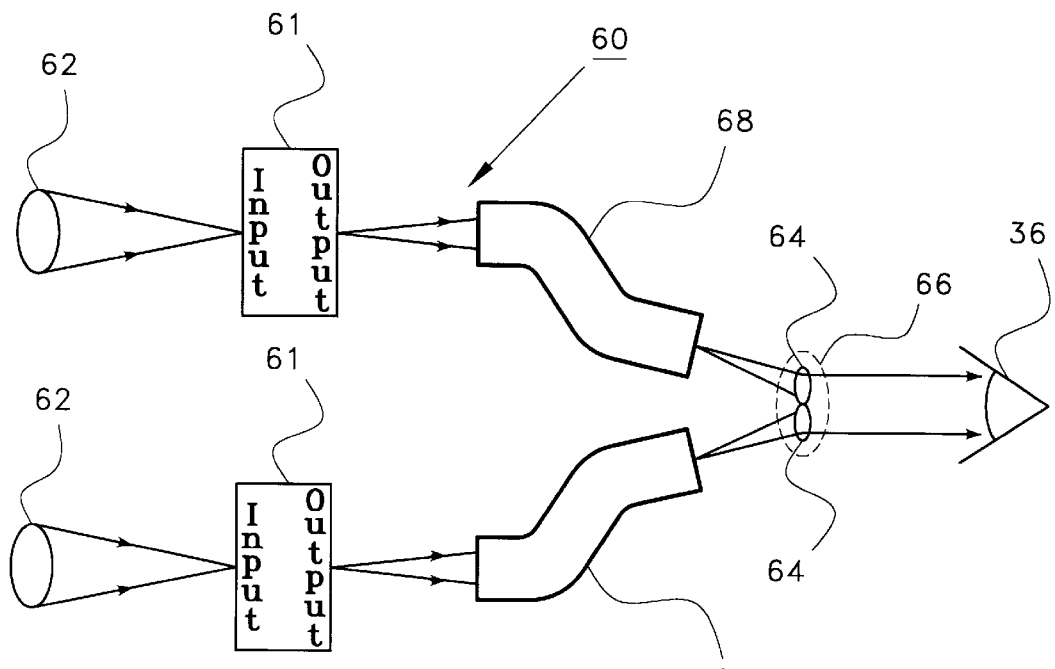
FIG. 4A schematically depicts a night vision goggle system made in accordance with a fourth embodiment of the present invention.

In FIG. 4A, a fourth embodiment of the system of the present invention is shown and denoted by the numeral 60. In this embodiment, the system 60 has four optical channels which are paired-off for each eye as shown, to provide a large field of view of approximately 40 degrees by 100 degrees. The two channels of each pair, has its own objective lens 62, image intensifier tube 61, and fused fiber-optic bundle element 68 for folding the optical path. The image translated by two fused fiber-optic bundle elements 68 of each pair is received by a common eyepiece which contains two eyepiece lens 64, one for each fused fiber-optic bundle element 68.

Figure 4B:
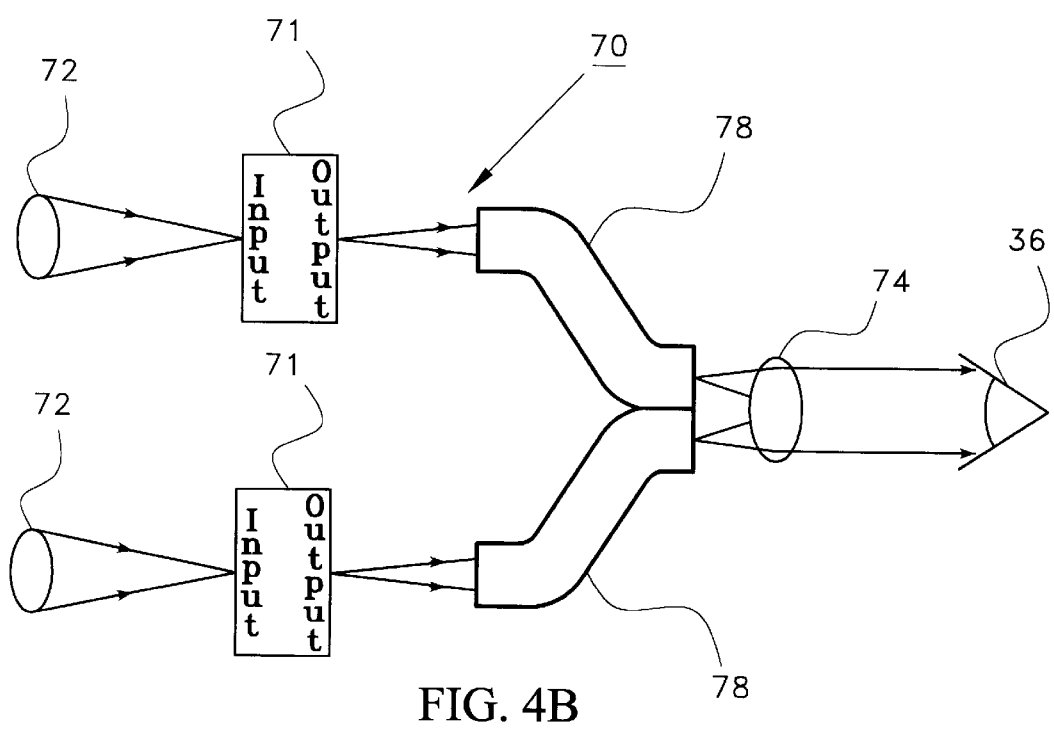
FIG. 4B schematically depicts a night vision goggle system made in accordance with a fifth embodiment of the present invention.

In FIG. 4B, a fifth embodiment of the system of the present invention is shown and denoted by the numeral 60.

The system depicted in this embodiment is a variant of the large field of view night vision goggle system shown in FIG. 4A with the exception that each pair of channels share a single fused fiber-optic bundle element 78 that translates the image to a single eyepiece lens 74 to save weight and space. Like in the embodiment of FIG. 4A, the two channels used provided for each eye 36 of the user, has its own objective lens 72 and image intensifier tube 71.

As mentioned briefly above, the optical designer has the flexibility to place the objective lens and image intensifier tube in whatever orientation is most conducive, in keeping the perceived weight low. This is due to the fact that the optical path folds may be turned in any orientation in all three dimensions without a change in optical performance. In addition, the fused fiber-optic bundle element used in the present invention turns the optical axis without requiring optical collimation (alignment) where prisms/mirrors often require difficult collimation. As a result, prism/mirror systems can sometimes manifest double images from poor collimation or collimation changing over temperature.

The another advantage realized by using the fiber-optic bundle element, is a substantial reduction in the requisite mechanical support structure, which reduces the system's weight. In some embodiments, the fiber-optic bundle element can be used as a structural member itself.

Still another advantage is that the fold mirror/prism systems cannot be designed to have as large a field of view as the system of the present invention. Moreover, the fields of view from two objectives can be combined as in the embodiment of FIG. 4B with a simple fused fiber-optic bundle element, thereby eliminating one lens element, to obtain extremely large fields of view. It will be understood that the embodiments described herein are merely exemplary and that a person skilled in the art may make many variations and modifications to the described embodiments utilizing functionally equivalent elements to those described.

These and any other variations or modifications to the invention described hereinabove are intended to be included within the scope of the invention as defined by the appended claims.

What is claimed is:

1. A night vision goggle system comprising:
   an objective lens for viewing an image scene;
   an image intensifier tube for amplifying a received image scene, said image intensifier tube having an input for receiving the image scene viewed by said objective lens and an output for producing an amplified image scene;
   an eyepiece lens for presenting the amplified image scene produced at said output of said image intensifier tube to a user's eye; and
   a fiber-optic element for folding an optical path between said image intensifier tube and one of said eyepiece lens and said objective lens thereby minimizing the length and weight of said system.

2. The night vision goggle system according to claim 1, further comprising a second fiber-optic element for folding a second optical path between said image intensifier tube and the other one of said eyepiece lens and said objective lens thereby further minimizing the length of said system.

3. The night vision goggle system according to claim 1, wherein said image intensifier tube is affixed to said fiber-optic element.

4. The night vision goggle system according to claim 1, wherein said fiber-optic element comprises a fused bundle of transparent fiber elements.

5. The night vision goggle system according to claim 1, wherein said fiber-optic element also inverts the image scene.

6. The night vision goggle system according to claim 5, wherein said fiber-optic element also magnifies the image scene.

7. The night vision goggle system according to claim 5, wherein said fiber-optic element also demagnifies the image scene.

8. The night vision goggle system according to claim 1, wherein said fiber-optic element also magnifies the image scene.

9. The night vision goggle system according to claim 1, wherein said fiber-optic element also demagnifies the image scene.

10. The night vision goggle system according to claim 1, wherein said fiber-optic element has at least one bend.

11. The night vision goggle system according to claim 10, wherein said at least one bend is substantially greater than 90 degrees.

12. The night vision goggle system according to claim 10, wherein said at least one bend is less than 90 degrees.

13. The night vision goggle system according to claim 10, wherein said at least one bend is approximately 90 degrees.

14. The night vision goggle system according to claim 1, wherein said fiber-optic element has a plurality of bends.

15. The night vision goggle system according to claim 14, wherein at least one of said bends is substantially greater than 90 degrees.

16. The night vision goggle system according to claim 1, wherein said fiber-optic element for folds said optical path between said image intensifier tube and said eyepiece lens thereby minimizing the length and weight of said system.

17. The night vision goggle system according to claim 16, further comprising:
   a second objective lens for viewing the image scene;
   a second image intensifier tube for amplifying a received image scene, said second image intensifier tube having an input for receiving the image scene viewed by said second objective lens and an output for producing an amplified image scene;
   a second eyepiece lens for presenting the amplified image scene produced at said output of said second image intensifier tube to the user's eye; and
   a second fiber-optic element for folding an optical path between said second image intensifier tube and said second eyepiece lens;
   wherein said objective lens, said image intensifier tube, and said fiber-optic element define a first optical channel and said second objective lens, said second image intensifier tube, and said second fiber-optic element define a second optical channel, said first and second optical channels providing a panoramic field of view of the image scene to the user's eye.

18. The night vision goggle system according to claim 17, further comprising a third optical channel and a fourth optical channel for the user's second eye, said third and fourth optical channels being substantially identical to said first and second optical channels, wherein said panoramic field of view provided by said first, second, third, and fourth optical channels is approximately 40 degrees by 100 degrees.

19. The night vision goggle system according to claim 16, further comprising:

a second objective lens for viewing the image scene; and a second image intensifier tube for amplifying a received image scene, said second image intensifier tube having an input for receiving the image scene viewed by said second objective lens and an output for producing an amplified image scene;

wherein said fiber-optic element also folds an optical path between said second image intensifier tube and said eyepiece lens, said objective lens and said image intensifier tube defining a first optical channel and said second objective lens and said second image intensifier tube defining a second optical channel, said first and second optical channels providing a panoramic field of view of the image scene to the user's eye.

20. The night vision goggle system according to claim 19, further comprising a third optical channel and a fourth optical channel for the user's second eye, said third and fourth optical channels being substantially identical to said first and second optical channels, wherein said panoramic field of view provided by said first, second, third, and fourth optical channels is approximately 40 degrees by 100 degrees.

* * * * *